United States Patent [19]
Ali et al.

[11] Patent Number: 5,945,470
[45] Date of Patent: Aug. 31, 1999

[54] CERAMIC-POLYMER COMPOSITE MATERIAL AND ITS USE IN MICROELECTRONICS PACKAGING

[76] Inventors: Mir Akbar Ali, 26430 Via Marquette, Lomita, Calif. 90717; Carl W. Peterson, 17701 S. Avalon Blvd. # 88, Carson, Calif. 90746; Harry C. Jones, 19606 Bouma Ave., Cerritos, Calif. 90703; Florentino V. Lee, 6050 Canterbury, F123, Culver City, Calif. 90230

[21] Appl. No.: 08/950,718

[22] Filed: Oct. 15, 1997

[51] Int. Cl.$^6$ .................................................. C08K 3/00
[52] U.S. Cl. ............................................. 524/404; 524/437
[58] Field of Search ...................... 524/404, 437

[56] References Cited

U.S. PATENT DOCUMENTS

| | | | |
|---|---|---|---|
| 4,327,014 | 4/1982 | Kawahara et al. | 523/116 |
| 5,401,695 | 3/1995 | Wu | 501/87 |
| 5,527,838 | 6/1996 | Afzali-Ardakani et al. | 523/223 |
| 5,531,945 | 7/1996 | Ohya et al. | 264/60 |
| 5,668,059 | 9/1997 | Christie et al. | 438/118 |

OTHER PUBLICATIONS

Neelakanta, Perambur S. Ph.D., C. Eng., "Handbook of Electromagnetic Materials, Monolithic and Composite Versions and their Applications", pp. 25–26.

*Primary Examiner*—Edward J. Cain
*Attorney, Agent, or Firm*—Terje Gudmestad; Georgann Grunebach; Michael W. Sales

[57] ABSTRACT

A ceramic-polymer composite material such as part of a microelectronics package is formed of a ceramic mixture of aluminum nitride and boron nitride, and a low-loss polymeric material. The amount of aluminum nitride is preferably from about 50 to about 90 weight percent of the ceramic mixture, but the relative amounts of the two ceramics may be adjusted to achieve thermal expansion and thermal conductivity properties required for a particular application. A mixture of the ceramics and uncured thermosetting polymeric resin is formed, pressed into the shape of the microelectronics base and/or lid, and heated (either concurrently or subsequently) to compress the mixture and cure the polymer.

13 Claims, 4 Drawing Sheets

CERAMIC-POLYMER COMPOSITE MATERIAL AND ITS USE IN MICROELECTRONICS PACKAGING

BACKGROUND OF THE INVENTION

This invention relates to a ceramic-polymer composite material, and, more particularly, to its use in making a microelectronics package.

A common approach to the fabrication of electronic devices is to form the electronic circuitry as a thick film having a large number of superimposed layers and interconnect circuitry, in a microelectronic package. The materials are selected to have required electronic, thermal, and mechanical properties, and the circuits are patterned to define the geometries of the circuit elements. With this approach, compact, light, fast devices may be made with large numbers of circuit elements in a single package. The circuits on the packages are connected externally with electrically conductive paths such as traces or vias.

The active chips are mounted on the package so as to be accessible and easily handled. The package is typically a ceramic housing having a generally flat base and a lid. The chip is mounted to the package base, external connections are made, and the lid is sealed over the base and its mounted chip. The package may be designed to be only physically protective, or it may also be made hermetic to protect against environmental attack.

In some packaging applications, the electronics inside the package produces a substantial amount of heat which heats the package. The entire package may also be heated and/or cooled during service by the external environment. The package must be effective to conduct heat away from the chip. Additionally, the package must not induce such large thermal strains in the chip that the chip is distorted or permanently damaged during service.

Electronics packages are typically made of sintered ceramics, metals, or alloys. A variety of designs and materials are employed in order to meet the technical requirements, and the packages also must be producible at an acceptable cost. There remains, however, a need for improved microelectronic packaging.

SUMMARY OF THE INVENTION

The present invention provides an improved material having tailorable thermal properties. The material is of particular utility in microelectronic packaging applications, and, more specifically, in space satellite communications systems. The invention also provides for the manufacturing of articles using the microelectronic packaging and a method of manufacturing articles such as microelectronic packaging. The approach of the invention is suitable to replace kovar, molybdenum, and copper-tungsten carriers presently used in microelectronic packages. The approach of the invention is economical, inasmuch as the cost of article manufacture is less than that of many prior approaches.

In accordance with the invention, a material comprises a mixture of aluminum nitride powder, boron nitride powder, and a polymeric binder component binding the aluminum nitride powder and the boron nitride powder together. The aluminum nitride powder and the boron nitride powder together may be viewed as constituting a ceramic component. Preferably, the ceramic component comprises from about 50 to about 90 weight percent aluminum nitride powder, and from about 50 to about 10 weight percent boron nitride powder. The ceramic component in turn is preferably present in the mixture in an amount of from about 90 to about 95 percent by weight of the total of the ceramic component and the polymeric binder component. The polymeric binder component desirably comprises a polymeric material having a dimensionless electrical loss of less than about 0.015. The polymeric binder material is preferably an epoxy or a cyanate ester.

The material mixture may be in the form of any of a variety of articles. In a preferred application, the mixture is at least one of the components of a microelectronics package, and most preferably comprises both the base and the lid of the package. The microelectronic interconnect circuit may be deposited onto a chip substrate, which in turn is affixed to the interior of the package base. Alternatively, the microelectronic circuit may be deposited directly onto the interior of the package base, with an appropriate electrical insulating layer between the circuit and the base.

A method for manufacturing an article includes providing a mixture of a ceramic component and a polymer component, wherein the ceramic component comprises a ceramic mixture of aluminum nitride powder and boron nitride powder, and the polymer component comprises an uncured polymeric resin material. The method further includes pressing the mixture in a die to about the shape of the article, and heating the mixture to a temperature sufficient to compact the mixture. The heating may be conducted either after or, preferably, concurrently with the pressing. Preferably, the uncured polymeric resin is thermosetting, and the heating accomplishes curing of the resin as well as compaction of the mixture.

The packaging material of the invention provides a new approach wherein the ceramic component provides a relatively high thermal conductivity to the package, and in which the relative amounts of the constituent ceramics may be selected to yield a preselected coefficient of thermal expansion. The aluminum nitride and boron nitride both have a relatively low density, leading to a light weight for the package. The ceramic components are bound together with the polymeric binder in the final product, as distinct from the conventional approach wherein there is no polymer present or the polymer initially present is burned out at a relatively low temperature, and the ceramic particles are sintered together so that the final product has no polymer present. Sintering requires much higher processing temperatures and consequently more expensive processing equipment, and also has a lower yield due to the temperature extremes required. With the present ceramic/polymer approach, product rework is greatly reduced as compared with the prior sintering technology for manufacturing a packaging material. The material of the present invention may be conventionally machined after processing, permitting final machining to precise sizes. Sintered ceramics may not be conventionally machined.

With the present approach, the entire package, including the ceramic substrate, the base, and the lid may be made from the same aluminum nitride-boron nitride-polymer system. This unique feature eliminates the coefficient of thermal expansion mismatch and the resulting stress associated with conventional packages. Further, in the manufacturing batch processing the electrically conducting interconnect circuitry is implanted in the housing structure, resulting in a cost-effective process.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 illustrate the base of the microelectronic assembly of FIG. 1, wherein

DETAILED DESCRIPTION OF THE INVENTION

Figure 1:
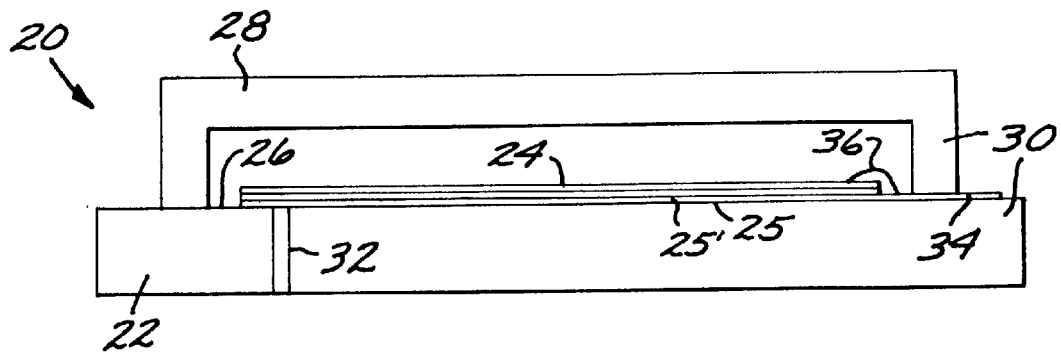
FIG. 1 is a sectional view of a microelectronic assembly.

The preferred application of the present invention is in relation to a microelectronic assembly 20, a representative form of which is illustrated in FIG. 1. The microelectronic assembly 20 includes a base 22, a microelectronic circuit 24 affixed to an upper side 26 of the base 22, and a cover or lid 28 that is affixed to the base 22 so that, taken together, the base 22 and the lid 28 (collectively, the "package" 30) enclose the microelectronic circuit 24. Any operable microelectronic circuit 24 may be used with the packaging approach of the invention, and approaches to the fabrication of microelectronic circuits are well known in their respective fields. The microelectronic circuit 24 may comprise active circuit elements deposited upon or fixed to a substrate 25 having an overlying nonconductive layer 25', with the substrate 25 affixed to the base 22. The microelectronic circuit 24 may also comprise circuit elements affixed directly to the base 22, as by deposition thereon with the nonconductive layer 25' between the base 22 and the electrically conductive elements of the microelectronic circuit 24 (and without any substrate 25 present).

External connection to the microelectronic circuit 24 are accomplished in any operable manner. One approach illustrated in FIG. 1 is a via 32 extending through the base 22 to the microelectronic circuit 24. Another approach is an electrically conducting surface trace 34 on the upper side 26 of the base 22 that extends from the interior of the package 30 to the exterior, with fine conducting wires 36 bonded at one end to the trace 34 and on the other end to bonding pads on the microelectronic circuit 24.

Figure 2A:
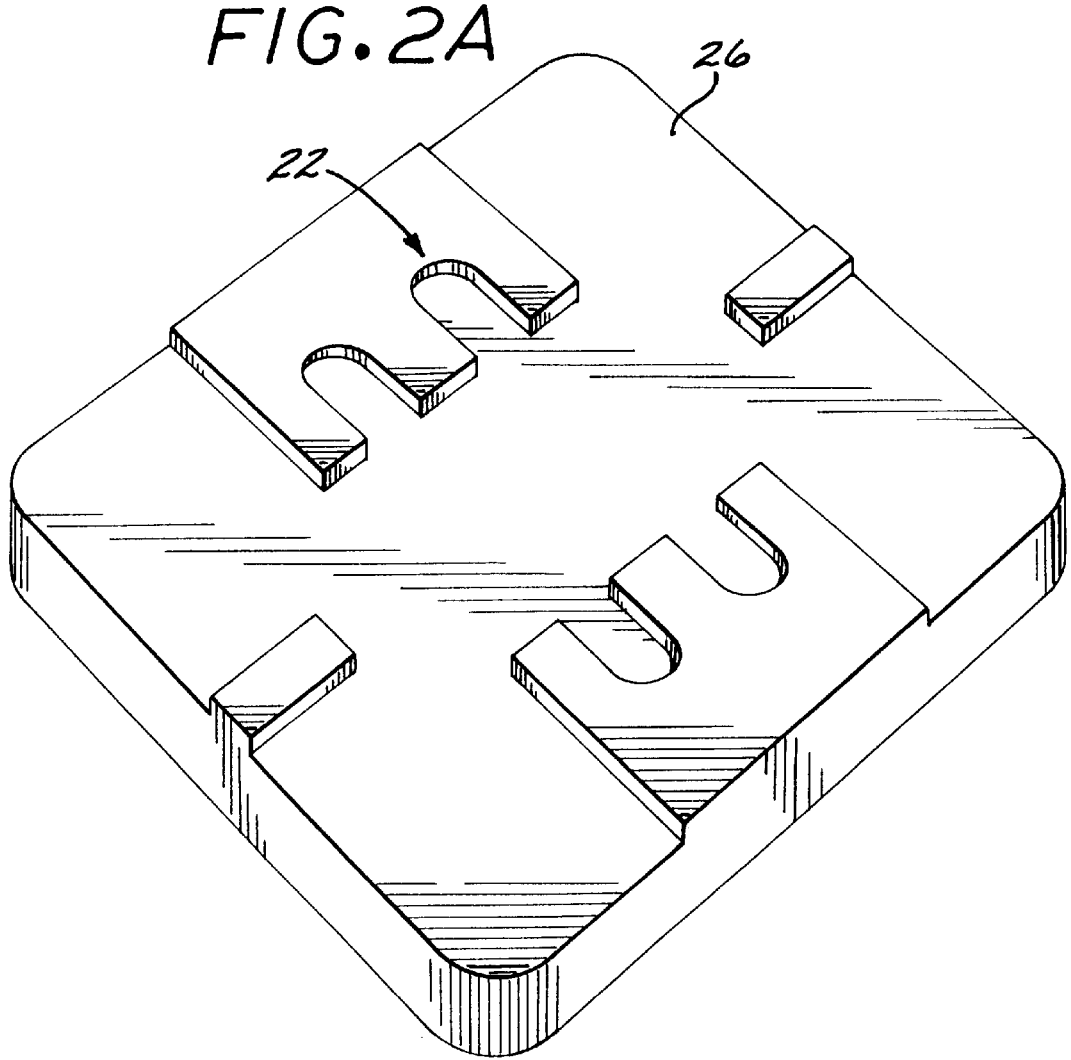
FIG. 2A is a perspective view.
Figure 2B:
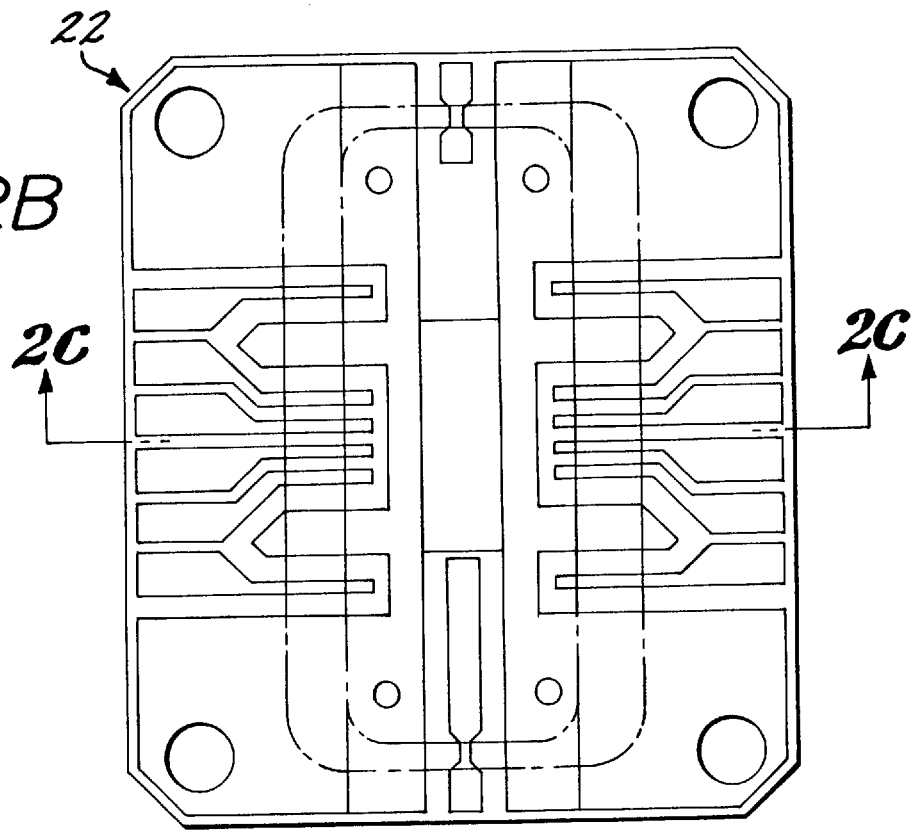
FIG. 2B is a plan view.
Figure 2C:
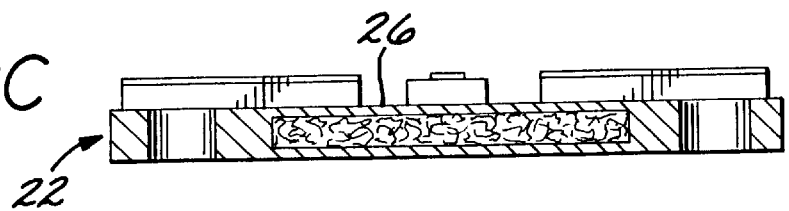
FIG. 2C is a sectional view taken along line 2C—2C of FIG. 2B.

FIGS. 2A–2C depict the base 22 in a form prepared by the inventors using the approach of the present invention. The upper side 26 of the base 22 may be patterned to provide input/output electrical terminals, to provide control terminals, or to securely receive one or more microelectronic circuits 24 (not shown in FIG. 2) thereon, or for other reasons. Such patterning is readily accomplished by the approach of the invention with an appropriate pressing mold or die.

Figure 3:
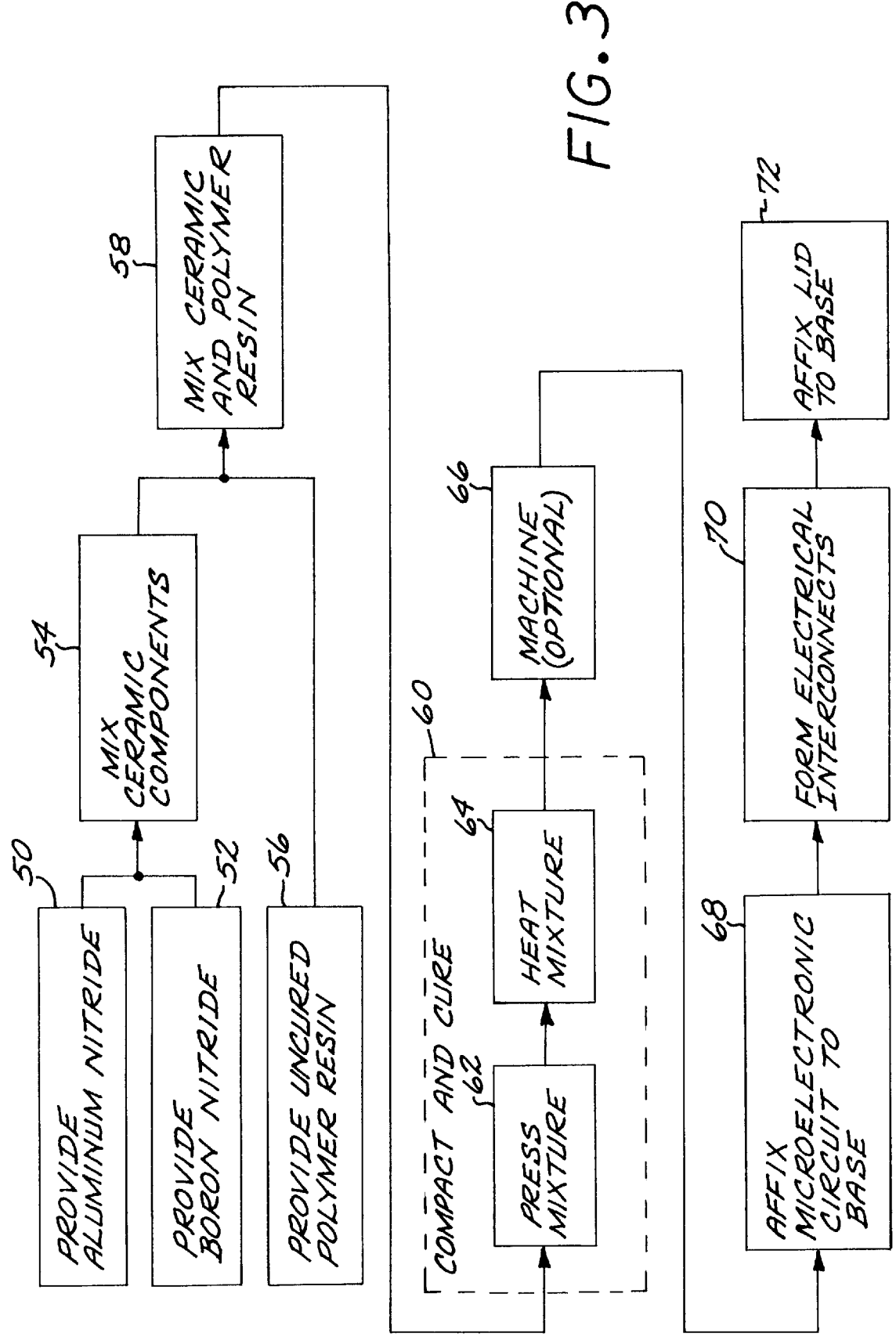
FIG. 3 is a block diagram of an approach for preparing a package component.

FIG. 3 is a block diagram of an approach for preparing an article according to the present invention, which will be described in terms of making a base 22 or lid 28, but which could be used to make a substrate or other articles as well. Preferably, both the base and the lid are made of the same material. Aluminum nitride (AlN) powder is provided, numeral 50, and boron nitride (BN) power is provided, numeral 52. Both of these materials are ceramics. These two materials are selected for several reasons. First, their thermal properties for many applications are far superior to those of other possible materials. Table I lists properties of some materials for possible use in this application. In Table I, the density is expressed in grams per cubic centimeter, the linear coefficient of thermal expansion ("CTE") is expressed in parts per million of length, per °K, and the thermal conductivity is expressed in watts per meter-°K.

TABLE I

| Material | Density grams/cc | CTE ppm/°K | Thermal Cond. Watts/M°K |
| --- | --- | --- | --- |
| Alumina | 3.98 | 7.1 | 20 |
| Aluminum Nitride | 3.26 | 4.1 | 117 |
| Boron Nitride | 2.27 | 1.20 | 55 |
| Beryllium Oxide | 3.01 | 8.1 | 251 |
| Copper | 8.90 | 17.0 | 400 |
| Invar | 8.00 | 1.60 | 10 |
| Kovar | 8.30 | 5.90 | 17 |
| Molybdenum | 10.20 | 17.0 | 140 |
| Silicon | 2.30 | 4.1 | 150 |
| Tungsten | 19.3 | 4.5 | 180 |

As seen from Table I, aluminum nitride and boron nitride have relatively high thermal conductivities, relatively low coefficients of thermal expansion, and relatively low densities. They are nontoxic and compatible with elements used in the microelectronic circuitry. A relatively high thermal conductivity is needed to dissipate heat within the package to eliminate hot spots, and to facilitate heat transfer from the microelectronic circuit 24 to the exterior of the package 30. A relatively low coefficient of thermal expansion is needed so as to approximately match the coefficient of thermal expansion of the base to that of the microelectronic circuit 24, and thereby minimize thermally generated strains and stresses. A relatively low density is needed in applications of most interest to the inventors, specifically the packaging of microelectronic circuits for use in aerospace applications. Aluminum oxide has been widely used in packages in the past, but it has a relatively low thermal conductivity. Metal/ceramic composites have also been used, but these materials have a coefficient of thermal expansion that is too large for many applications and also tend to be of high density.

The aluminum nitride powder and the boron nitride powder preferably have a range of powder sizes in the range −325 mesh. Use of a range of powder sizes, rather than a single powder size, allows the powders to pack closely together during the subsequent fabrication.

A preferred aluminum nitride powder is KT grade supplied by Hermann C. Strack, Inc. Another preferred aluminum nitride power is silica-coated aluminum nitride ("SCAN") supplied by the Dow Chemical Company, Midland, Mich. The silica coating on the aluminum nitride protects it from moisture intrusion. If the uncoated aluminum nitride powder is used, processing is performed in a glove box containing a moisture-free, inert atmosphere. The preferred boron nitride powder is "Combat" grade supplied by the Carborundum Company.

The aluminum nitride powder and the boron nitride powder are mixed together, numeral 54, to form a ceramic component mixture. The mixing is preferably accomplished in a ball mill with an evaporable fluid, such as isopropyl alcohol, as a slurry carrier to promote uniform mixing. After mixing is complete, the slurry carrier fluid is evaporated by any operable approach, the resulting cake is crushed and ground, and the resulting powder is thereafter sieved again to the desired size, in this case −325 mesh.

The aluminum nitride powder and the boron nitride powder are preferably mixed in amounts sufficient to form the ceramic component mixture having from about 50 to about 90 weight percent aluminum nitride powder, and from about 50 to about 10 weight percent boron nitride powder. These ranges are selected to provide the required range of the coefficient of thermal expansion of the final product. Higher or lower weight fractions of the constituents may be operable for some applications, but result in coefficients of thermal expansion that are not desirable for typical microelectronics applications.

An uncured polymer resin is provided, numeral 56. For electrical applications, the resin should have an electrical loss of less than about 0.015 (dimensionless). Operable resins include thermosetting epoxies such as the Shell Epon series and cyanate esters such as DuPont cyanate esters. Commercial sources of operable epoxies include Shell Epon 828, 861, and 3124 with W binder. Commercial sources of operable cyanate esters include Fiberite 954, Dow Quatrex 7187, Bryte Technologies BTCy-1, BTCy-2, BTCy-3, and EX-1515. Of these operable resins, cyanate esters are preferred. The Bryte Technologies BTCy cyanate esters, often called polycyanates, have excellent performance to temperatures as high as about 350° F., and have low microcracking, low outgassing, low moisture absorption, low dielectric constant, and low loss tangent.

The ceramic component and the polymer resin component are mixed together, numeral 58. The ceramic component is a mixture of solid powders, prepared as described previously, and the polymer resin component is a viscous fluid. The mixing is preferably accomplished by incrementally adding the ceramic component to the polymer resin component and stirring each portion of the ceramic component into the polymer component prior to adding the next portion. Mixing is continued until a thorough mixture is achieved.

The polymer component serves to bind the ceramic component particles together. The larger the amount of the polymer component in the final material, the lower is its thermal conductivity. Since the thermal conductivity is preferably maintained relatively high, the amount of the polymer component is no greater than necessary to bind the ceramic particles together. In the preferred approach, the ceramic component is present in the mixture in an amount of from about 90 to about 95 percent by weight of the total of the ceramic component and the polymeric binder material. Most preferably, the amount of the ceramic component is about 92.5 percent by weight of the total of the ceramic component and the polymer component.

An appropriate amount of the mixture of the ceramic component and the polymer component is compacted and cured, numeral 60. This step includes pressing the mixture, numeral 62, typically in a mold or die having a cavity shaped to define a portion of a microelectronics assembly, such as the base 22 or the lid 28. The mold is configured with the desired shape of the final article, such as the features shown in FIGS. 2A–C on the upper side 26.

To aid in compacting the mixture, the mixture is heated to an elevated temperature, numeral 64. The preferred organic binders are provided as thermosetting resins, and the heating also serves to cure the resin. The pressing 62 and heating 64 may be accomplished in that order, but are more preferably accomplished simultaneously. In a preferred approach using the cyanate ester resin, a uniaxial pressure of about 10,000 psi is applied to the mold to compress the mixture therein, at room temperature. The temperature is gradually increased, while maintaining the pressure, to about 350° F. over a period of one hour and thereafter held constant for about 2½ hours. The temperature-time cycle is selected according to the recommended curing cycle for the selected resin. After the curing is complete, the article is cooled to room temperature. In the preferred approach, the article is cooled with the pressure maintained in a time of 2–4 hours.

Figure 4:
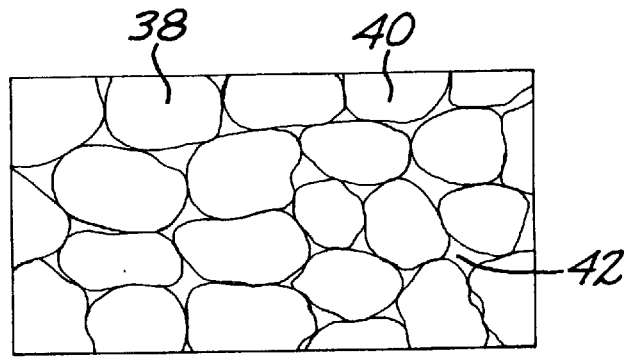
FIG. 4 is a sectional view of the microstructure of the material of the invention.

FIG. 4 is a schematic representation of a typical microstructure of the material of the invention, after the completion of the compaction and curing step 60. The microstructure includes aluminum nitride particles 38, boron nitride particles 40, and cured polymer material 42 binding the particles 38 and 40 together. The relative amounts of the three phases 38, 40, and 42 depend upon the proportions of the phases as selected above. However, because the amount of the structure occupied by the particles 38 and 40 is much greater than that occupied by the polymer 42, the particles 38 and 40 have touching or nearly touching contact in many areas. The final material therefore has a thermal conductivity and a thermal expansion coefficient that are controlled largely by the nature and proportions of the particles.

This approach is contrasted to conventional solid state sintering, where the processing temperature is much higher and no polymer phase is present by the time the sintering temperature is reached. (There may be a polymer binder initially present in the sintering approach prior to sintering, but it is burned away and is not present in the final product.) For example, the temperature for sintering conventional aluminum oxide package components is about 1200° C. The present approach uses apparatus having a lower operating capability, an important economic advantage. Additionally, there is a high degree of shrinkage during sintering, while the present approach has a lesser degree of shrinkage. Accordingly, the article may be made quite close to its final shape and size.

By virtue of the method of fabrication, the final article is close to its final size. However, the article may be given an optional final machining, numeral 66, to achieve highly accurate final dimensions, if required. Conventionally sintered ceramic articles cannot be final machined by conventional techniques, but instead require the use of grinding or special tools. The material of the present invention may be machined with conventional tools. Machining studies showed that increasing fractions of boron nitride in the ceramic component led to improved machinability.

The processing of the packaging, the base and the lid is completed in this manner.

The microelectronic circuit 24 is affixed to the base, numeral 68, by any operable approach. If the microelectronic circuit is furnished as circuit elements on a substrate, the substrate is affixed to the base by any operable technique such as a thermally conductive adhesive or brazing.

The microelectronic circuit may also be deposited directly onto the base, by first depositing the electrically nonconductive layer 25' and thereafter depositing the electrically conductive elements overlying the nonconductive layer. In either case, the electrical interconnects are formed, numeral 70, such as by wire bonding wires 36 or connecting to the vias 32. Lastly, the lid 28 is affixed to the base 22 by any operable technique, such as an adhesive or brazing. Thus, a unique feature of the present invention is that the entire package including the base and the lid, as well as the microelectronic circuit substrate, may be made of the same aluminum nitride-boron nitride-polymer material.

Figure 5:
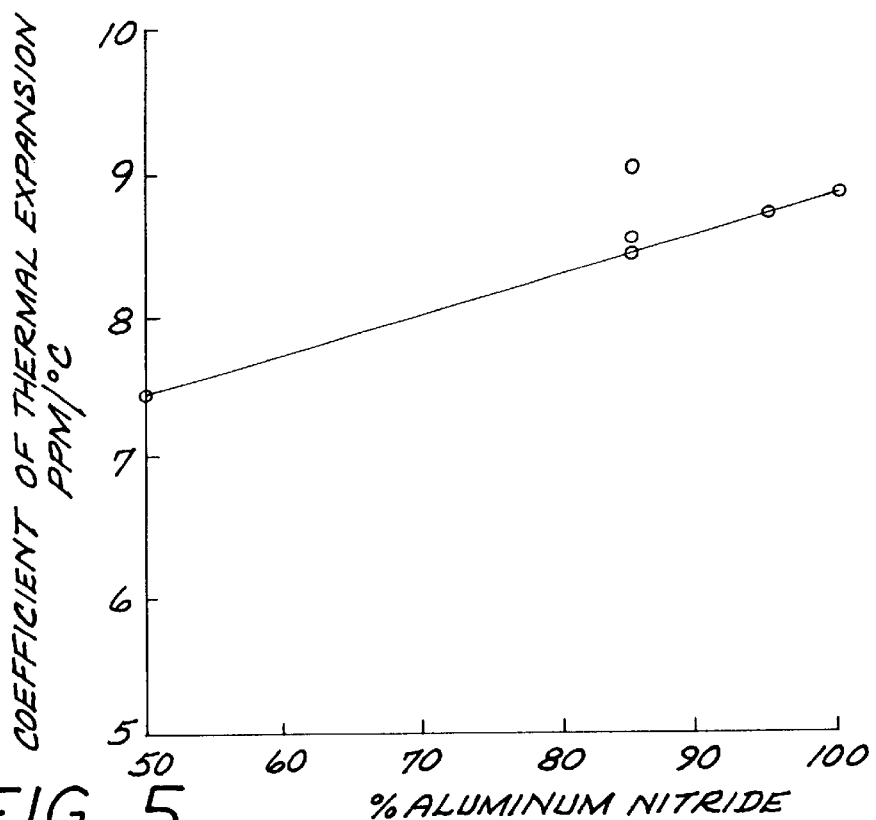
FIG. 5 is a graph of coefficient of thermal expansion as a function of the composition of the ceramic component, for a fixed proportion of the ceramic component in the mixture.
Figure 6:
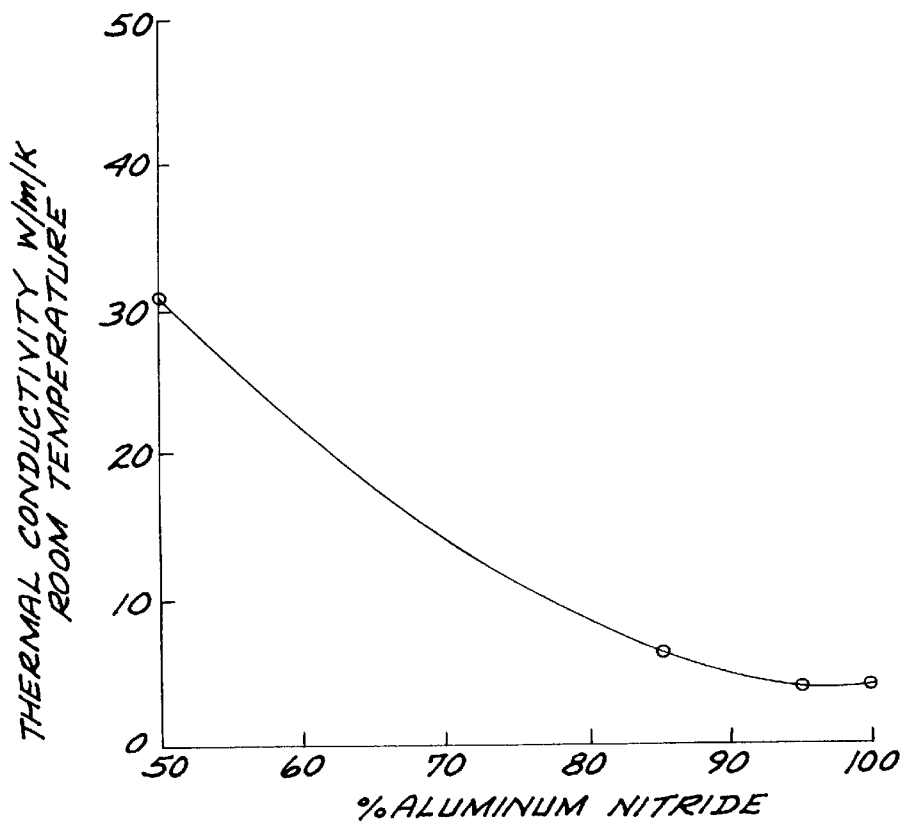
FIG. 6 is a graph of thermal conductivity as a function of the composition of the ceramic component, for a fixed proportion of the ceramic component in the mixture.

Specimens were prepared with the weight ratios of aluminum nitride: boron nitride in the ceramic phase in the amounts of 100:0, 95:5, 90:10, 85:15, and 50:50. The first specimen having no boron nitride is not within the scope of the invention, while the second-fifth specimens are within the scope of the invention and the third-fifth specimens are within the preferred range of the invention. The weight ratio (aluminum nitride+boron nitride):polymer was maintained constant at 92.5 parts:7.5 parts. After fabrication of the specimens by the approach discussed above, linear coefficients of thermal expansion and the thermal conductivities were measured for the specimens and are plotted as a function of the composition of the ceramic component in FIGS. 5 and 6, respectively. As shown in these figures, the coefficient of thermal expansion of the final composite material may be controllably varied by varying the proportions of the ceramics in the composite material, which also causes the thermal conductivity to vary.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A material comprising a mixture of
   a ceramic component comprising
      aluminum nitride powder, and
      boron nitride powder; and
   a cured polymeric binder component binding the aluminum nitride powder and the boron nitride powder together.

2. The material of claim 1, wherein the ceramic component comprises
   from about 50 to about 90 weight percent aluminum nitride powder, and
   from about 50 to about 10 weight percent boron nitride powder.

3. The material of claim 1, wherein the ceramic component is present in the mixture in an amount of from about 90 to about 95 percent by weight of the total of the ceramic component and the polymeric binder component.

4. The material of claim 1, wherein the polymeric binder component comprises a polymeric material having an electrical loss of less than about 0.015.

5. The material of claim 1, wherein the polymeric binder component is selected from the group consisting of an epoxy and a cyanate ester and combinations thereof.

6. The material of claim 1, wherein the polymeric binder component comprises a cyanate ester.

7. The material of claim 1, wherein the aluminum nitride powder is coated with silicon.

8. The material of claim 1, wherein the weight ratio of the ceramic component to the cured polymeric binder component is about 92.5 to about 7.5.

9. A material comprising a mixture of
   a ceramic component comprising
      from about 50 to about 90 parts by weight of aluminum nitride powder, and
      from about 50 to about 10 parts by weight of boron nitride powder; and
   a cured polymeric binder component binding the aluminum nitride powder and the boron nitride powder together, wherein the polymeric binder component is selected from the group consisting of an epoxy and a cyanate ester and combinations thereof.

10. The material of claim 9, wherein the ceramic component is present in the mixture in an amount of from about 90 to about 95 percent by weight of the total of the ceramic component and the polymeric binder component.

11. The material of claim 1, wherein the ceramic component comprises
   from about 50 to about 90 weight percent aluminum nitride powder, and
   from about 50 to about 10 weight percent boron nitride powder.

12. The material of claim 1, wherein the ceramic component is present in the mixture in an amount of from about 90 to about 95 percent by weight of the total of the ceramic component and the polymeric binder component.

13. The material of claim 9, wherein the polymeric binder component is selected from the group consisting of an epoxy and a cyanate ester and combinations thereof.

* * * * *